April 29, 1941.     R. J. MONTGOMERY     2,239,755
WIRE STRIPPING MACHINE
Original Filed April 13, 1937     2 Sheets-Sheet 1
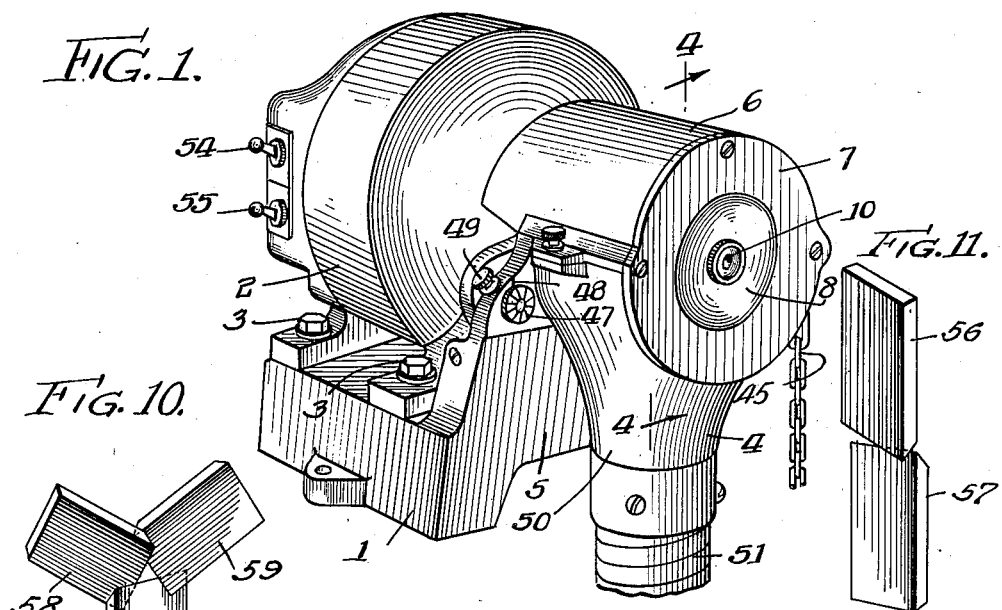
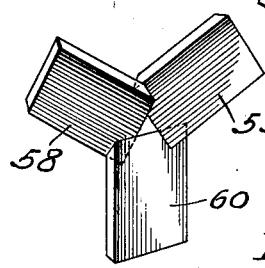
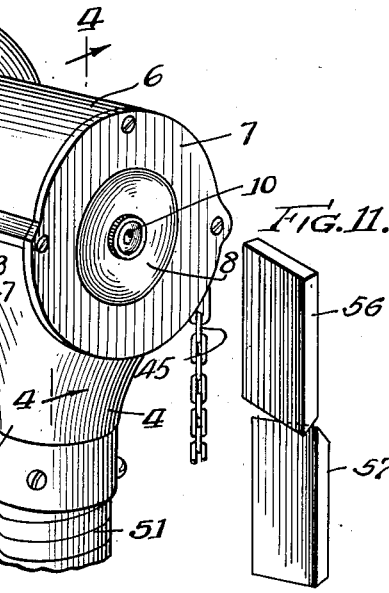
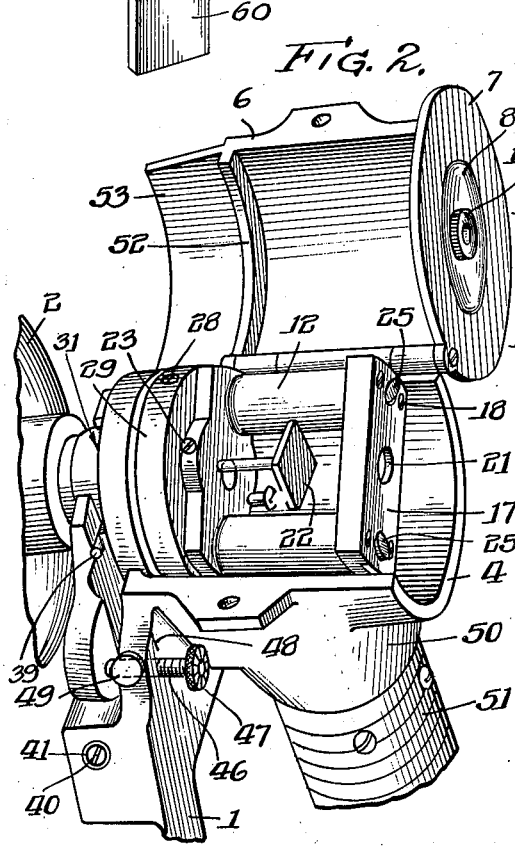
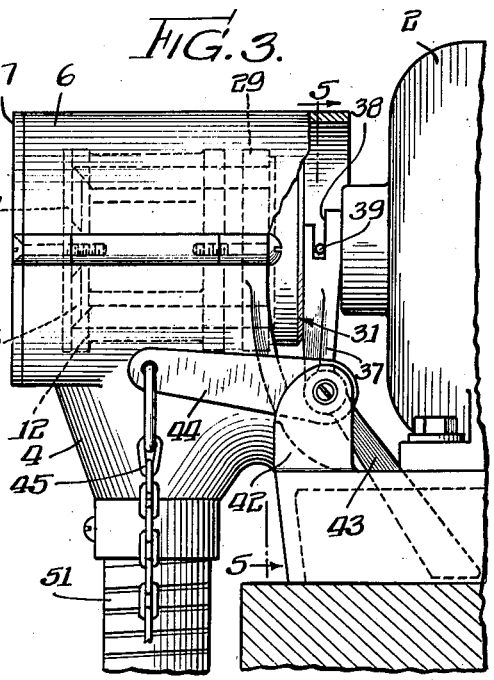
Inventor
Robert J. Montgomery
By: Cox & Moore attys.

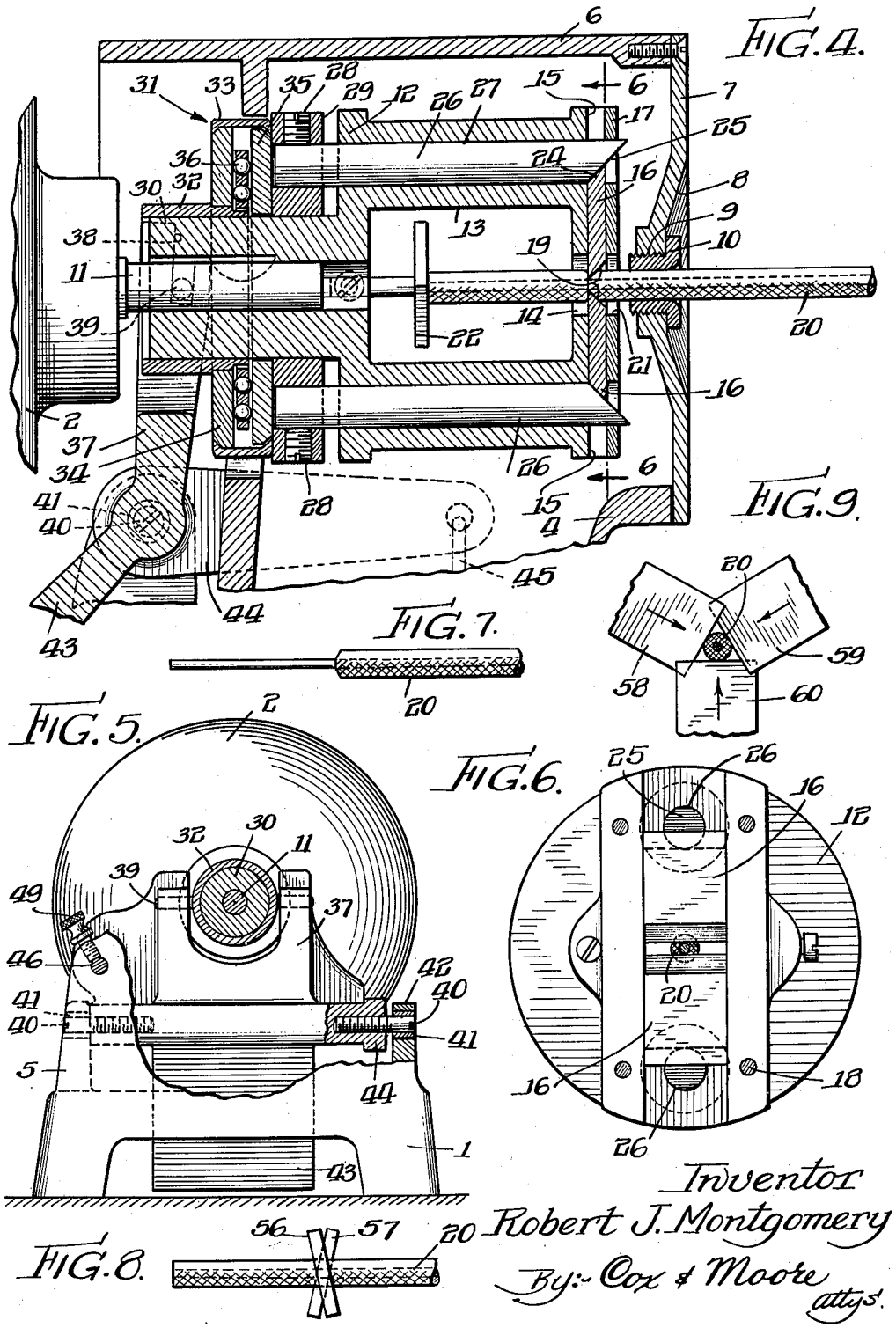

Patented Apr. 29, 1941

2,239,755

UNITED STATES PATENT OFFICE 2,239,755

WIRE STRIPPING MACHINE

Robert J. Montgomery, Chicago, Ill.

Application April 13, 1937, Serial No. 136,631
Renewed August 10, 1939

5 Claims. (Cl. 81—9.51)

This invention relates to a machine for removing the insulation from the ends of electrical conductors so that a length of the latter may be exposed for making electrical connections.

It is an object of this invention to provide a more compact and efficient wire stripping machine.

Another object of the invention is to provide a portable wire stripping machine which shall be capable of transportation to and use in any desired location.

Another object of the invention is to provide an improved operating mechanism for a wire stripping machine which shall render its operation more efficient and provide a convenient and precise adjustment for adapting the machine to the different sizes of wires.

Another object of the invention is to provide a more positively acting retractile mechanism for the stripping blades.

Another object of the invention is to provide adjustable means for determining the length of insulation which shall be removed from the end of the conductor.

Another object of the invention is to provide means for centering the conductor relative to the stripping blades.

Another object of the invention is to provide a wire stripping machine with a cover member which is readily operable to give access to the operating parts of said mechanism.

Another object of the invention is to provide means for avoiding pulling of the wire caused by the longitudinal movement of the conductor member relative to the severed insulation.

Another object of the invention is to provide a wire stripping machine, stripping blades or cutters which shall exert a screw-like action on the conductor member, thereby to effect twisting of the strands of a multi-strand conductor member and to minimize the pulling of the wire during the removal of the insulation.

Numerous other objects and advantages will be apparent from the following description, which, when considered with the accompanying drawings, discloses illustrative embodiments of the invention, wherein:

Fig. 1 is a view in perspective of a wire-stripping machine according to applicant's invention.

Fig. 2 is a perspective view of the stripping head with the cover member in open position.

Fig. 3 is a fragmentary vertical elevation of the machine.

Fig. 4 is a vertical section through the stripping head taken on the line 4—4 of Fig. 1.

Fig. 5 is a vertical elevation partly in section taken along the line 5—5 of Fig. 3.

Fig. 6 is a vertical section taken along the line 6—6 of Fig. 4.

Fig. 7 is a fragmentary view of an insulated conductor with the insulation removed by the stripping machine.

Fig. 8 is a diagrammatic view showing a modified arrangement of stripping blades.

Fig. 9 is a diagrammatic view showing another modified arrangement of stripping blades.

Fig. 10 is a perspective detail view of the blades shown in Fig. 9, the perspective view more clearly showing the relative arrangement of the three blades in operative relationship.

Fig. 11 is a view the same as Fig. 10 showing in perspective the arrangement of the blades shown in Fig. 8.

Referring to the drawings, the reference numeral 1 indicates a base member or casting upon which a motor 2 is mounted by bolts 3. At its forward end the base member 1 supports a housing 4 connected thereto by an integrally formed upstanding bracket 5. The housing 4 has pivoted thereto at one side a cover member 6 which forms with the housing 4 a stripping chamber. To the cover there is secured a front plate 7 which is provided centrally with a concave portion 8 having a threaded aperture 9 for detachably receiving a threaded bushing 10. The threaded bushing 10 is provided with a central opening to permit the passage of the conductor to be stripped and to center the same relative to the cutters.

The shaft 11 of the motor 2 projects into the stripping chamber formed by the member 4 and the cover member 6 and has secured thereto a cutter head 12 which has a large diametrical passageway 13 at the forward end and an axial opening 14 communicating with the passageway 13. The front face of the cutter head 12 is milled out diametrically to provide grooves 15 in which a pair of knives or stripper blades 16 are slidably held by a cover plate 17. The cover plate 17 is secured in any convenient manner, as by screws 18, to the cutter head 12. The knives or stripper blades 16 have their inner ends beveled as shown to form cutting edges 19 which exert a shearing action on the conductor interposed therebetween when the cutter head is rotated. The conductor member 20 is inserted through the central opening in the bushing 10, through an opening 21 in the cover plate 17, to and between the blades 16 and through the opening 14 in the cutter head, the movement of the conductor 20 inwardly of the cutter head being limited by its engagement with a stop or plate 22 adjustably mounted in the cutter head 12 and secured in place by a set screw 23.

The outer ends of the knives 16 are beveled as indicated at 24 and are engaged by the correspondingly beveled camming faces 25 of axially movable cams or pins 26 which are slidable longitudinally into bored-out openings 27 of the cutter head. At their rear ends the pins or cams 26 are secured by set screws 28 to a disk or crosshead 29 which is slidably mounted on the sleeve portion 30 of the cutting head. The crosshead or disk 29 is adapted to slide longitudinally, or axially, relative to the head 12 but is caused to rotate therewith by its connection to the pins 26. Rearward movement of the crosshead is caused by the centrifugal action of the knives 16, whose beveled edges 24 engage the beveled edges 25 of the pins 26. The forward movement of the crosshead is caused by a control member 31 which is mounted by a sleeve 32 for slidable movement on the sleeve portion 30. The control member 31 comprises a hardened steel ring 33 to the rear edge of which is fixedly secured a disk 34 and the disk 34 is separated from a like disk 35 loosely journaled in the ring 33 by a roller bearing 36. The loosely journaled disk 35 is provided with a hardened steel surface offering a frictionless bearing surface for the crosshead 29. The control member 31 is held against rotation by a fork-shaped lever 37 which is provided with radial slots 38 and the tines thereof engage pins 39 secured to and extending radially from the sleeve 32. The lever 37 is pivoted by pins 40 and bushings 41 to the rearwardly extending flanges 42 of the upstanding bracket portion 5, and the lever 37 has formed therewith, opposite the fork 37, a counterweight 43 which urges the lever in a counterclockwise direction (Fig. 4) to retract the control member 31. A forwardly extending lever or arm 44 is also formed integrally with the lever 37 and has connected to its outer end an operating chain or rod 45 which may be secured to an operating foot pedal (not shown).

The movement of the control-operating lever 37 in a forward direction is limited by a micrometer set screw 46 threaded through the upper portion of the bracket portion 5 and projecting rearwardly therefrom to a position to engage the front surface of said lever. The head 47 of the micrometer adjusting screw is provided with twelve radially extending lines or grooves which cooperate with a fixed index line or groove 48 carried by the bracket portion 5 to indicate the setting of said screw. The micrometer screw is held in adjusted position by a set screw 49 as shown in Figs. 1, 3 and 5. The housing member 4 is provided with a downwardly extending tubular portion 50 to which is secured a flexible tube 51 for conveying the severed material from the stripping chamber 4.

The cover member 6 is provided with an annular flange 52 which extends inwardly adjacent the ring 33 of the control member 31 and provides a baffle which prevents escapement of the waste insulation to the rear of the housing. The housing member 6 is further provided with a rearwardly extending portion 53 which overlies the control members 30 and 31, the lever 37 and the motor shaft to prevent the accumulation of dirt which might interfere with the operation of such mechanism.

The motor 2 is adapted to be controlled in forward and reverse directions by switches 54 and 55 which are mounted upon the motor housing as shown in Fig. 1.

In using this machine the forward or reverse control switch 54 or 55 is operated depending upon whether the wires to be stripped are twisted from left to right or from right to left. The motor 2 operates the cutter head 12 continuously at a high rate of speed so that centrifugal force impels the knives 16 outwardly against the beveled faces 25 of the cam pins 26, thereby forcing the pins rearwardly and moving the crosshead 29 to its furthermost rearward position, the clutch member 31 being normally maintained in the rearward position by the counterweight 43. The end of the conductor 20, from which insulation is to be removed, is inserted through the central opening of the bushing 10, through the openings 21 and 14 in the cover plate 17 and the cutter head 14 until it engages the gauge plate 22, the plate having been previously adjusted to such a distance from the inner ends of the cutter blades as corresponds to the length of insulation desired to be removed from the conductor. When the conductor 20 has thus been inserted, a chain or rod 45 is operated to rotate the clutch control lever 37 in a clockwise direction into engagement with the micrometer screw 46 which latter has been adjusted to permit the cutter blades to move inwardly a sufficient distance to cut the insulation and barely touch the outer surface of the conductor member without injuring the latter. This operation of the clutch control lever 37 moves the control member 31 forwardly and forces the crosshead 29 axially of the cutter head 12 to move the cam pins 26 outwardly relative to the cutter blades. The cutter blades 16 are forced inwardly by the beveled surfaces of these cam pins.

After the insulation has been severed from the conductor the same is pulled outwardly while the rod 45 is held operated so that the severed insulation is stripped off the conductive member and the cut-off end of insulation drops into the tubular portion 50 of the stripping housing and into the waste tube 51.

Because of the shape of the cutting edges of the cutter blades and because the cutting head is continuously rotating, the cutter blades will exert a screw-like action on the exposed end of the conductive member during the withdrawal movement of the conductor, thereby twisting the strands in the case of a stranded conductor, and at the same time employing the longitudinal pulling action to effect the desirable twisting of the strands. This screw-like action of the cutter blades may be enhanced materially by arranging the blades relative to the conductor as shown in Fig. 8, in which the blades 56 and 57 are diagrammatically shown as being angularly offset with respect to the axis of the conductor and with respect to each other. It will be apparent that such arrangement may be accomplished by suitably inclining the milled guideways 15 in which the cutters are mounted to support the cutters at the illustrated angle, namely, at an acute angle with respect to a plane normal to the axis of rotation of the cutters.

In other words, it will be noted in Fig. 6 that the blade-receiving groove is arranged in a plane normal to the axis of rotation of the rotor or cutter head 12. The base or bottom wall of the groove is arranged in an identical plane, as clearly shown in Fig. 6. It will be understood by anyone skilled in the art that in providing a suitable mounting groove for supporting the blades 56 and 57 in accordance with the relative positioning shown in Fig. 11, the grooves will be inclined slightly with respect to the aforementioned plane about an axis centrally of each of the grooves. This may be easily done during manufacture by merely inclining the cutter head slightly through a predetermined angle during the milling operation. It will be understood that the grooves will be oppositely inclined on either side of the central axis of the head. A head suitable for supporting the blade arrangement shown in Fig. 10 will be made in identically the same manner by providing three grooves equally angularly spaced.

In Fig. 9 a still further modification of the arrangement of cutter blades to enhance the screw-like movement between the cutter blades and the conductor is shown. In this figure the stripping blades 58, 59 and 60 are arranged in grooves cut in the surface of the cutter head at angles of 120 degrees, the plane of the blades 58 and 59 being inclined relative to the blade 60 and relative to each other so that the edges overlap as shown in Fig. 9. This arrangement of the blades in the cutter head can obviously be effected by providing three milled grooves in place of the pair of milled grooves 15 hereinbefore described, but it will be apparent to anyone skilled in the art that these grooves will necessarily be so arranged as to support the blades in the aforementioned relationship, such as shown clearly in Fig. 9. To this end the depth of the milled grooves will necessarily vary in an angular direction about the central opening in the cutter head. In other words, the bases of the grooves and, accordingly, the positioning of the blades supported thereby will be such that each is inclined at an acute angle with respect to a plane normal to the axis of rotation of the head.

It will be understood from the foregoing that the depth of the grooves as measured from their plane of rotation varies in the direction of rotation. That is to say, each inclined knife and, accordingly, the base of its groove will gradually increase in depth or distance from this plane as they progress in a rotational direction about the central opening in the cutter head. So also, it will be understood from the foregoing that by the bases of the grooves applicant refers to the flat bottom wall portion of each groove, such as is clearly visible in Fig. 6, which wall is normally contiguous to the flat side face of a blade when in assembled operative position. By the term "angularly offset with respect to the axis of the conductor and with respect to each other" is meant that the blades 56 and 57, for example, are arranged so that they make an angle with respect to the axis of the conductor and also are arranged in planes which are angularly offset. Thus, referring to Figs. 8 and 11, it will be seen that while the blades 56 have a common longitudinal axis, nevertheless the blades are respectively rotated about this axis so that the planes of the two blades make an angle with each other. At the same time it will be obvious that the axis as well as the plane of each of these blades forms an angle with the axis of the conductor in operative relationship.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In a machine for stripping insulation from wire, the combination of a driving motor having an operating shaft, a disk-like member mounted on said shaft having three radial guideways separated by substantially equal angles from center to center, knives slidable in said guideways to and from the axis of rotation of said member and having their cutting edges arranged in planes angularly offset relative to each other, and means operable during rotation of said member simultaneously to slide the knives inwardly in their guideways toward the axis of rotation of said member.

2. In a machine for stripping insulation from wire, the combination of a driving motor having an operating shaft, a member mounted on said shaft and having a pair of radial guideways, the base of each guideway being inclined at an acute angle to a plane normal to the axis of rotation of said member, a plurality of knives slidable in said guideways to and from the axis of rotation of said member, the knives being arranged so that their adjacent side portions overlap to permit free, radial, inward movement while so overlapped, and means operable during rotation of said member simultaneously to slide the knives inwardly in their guideways toward the axis of rotation of said member.

3. In a machine for stripping insulation from wire, the combination of a rotatable member having a pair of alined radial guideways, the base of each guideway being inclined at an acute angle to a plane normal to the axis of rotation of said member, a pair of cutters slidable in said guideways to and from the axis of rotation of said member, means to adjust said cutters toward the axis of rotation and automatically operable means for moving said last means in the opposite direction to permit said cutters to move said shiftable means in the opposite direction.

4. In a machine for stripping insulation from wire comprising a rotatable member having a plurality of substantially radial guideways, a plurality of stripping knives having their planes angularly offset relative to each other and slidable in said guideways to and from the axis of rotation of said member, and means operable during rotation of said member simultaneously to slide the knives inwardly in their guideways toward the axis of rotation of said member.

5. A machine for stripping insulation from wire comprising a horizontal base, a drive motor mounted directly on the base and having a horizontal projecting drive shaft, a rotatable cutter head having a reduced portion rigidly mounted on the drive shaft for rotation therewith, radially movable cutters on said head and axially shiftable cam means for controlling the position of the cutters, a collar journaled on said reduced portion of the head coaxially therewith and for limited axial reciprocation, pins projecting on opposite sides of said collar and rigid therewith, lever means comprising three integral arms projecting outwardly from a central journal portion, said journal portion being pivoted on said base, one of said lever arms extending upwardly from the base and on both sides of said collar, said upwardly extending lever arm being forked at its upper extremities and said forked portions oppositely engaging said pins for positive interconnection between said lever and said collar for moving the collar in both directions axially of the head, antifriction thrust bearing means comprising a bearing race coaxial with the shaft and rigidly attached to the said collar, a complementary bearing race in juxtaposition to the axially shiftable cam means, an axially extending flanged ring rigidly interengaged with said first named race and loosely embracing said second named race for limiting the axial separation thereof, the second arm of the lever extending at an obtuse angle to said first arm and disposed below the motor in a plane intersecting the base, said base being cut away to accommodate the said lever centrally thereof, and said second lever comprising a counterweight portion spaced from said journal for normally urging said collar axially toward the motor and away from said cam means, the third arm of said lever extending in a direction away from the motor and comprising means for actuating said lever to opposite axial position against the action of the counterweight, and adjustable means contacting the lever means to determine the axial advance of the collar to thus control the depth of cut of said cutters.

ROBERT J. MONTGOMERY.